United States Patent
Wada et al.

(10) Patent No.: US 6,941,572 B2
(45) Date of Patent: Sep. 6, 2005

(54) OPTICAL INFORMATION RECORDING MEDIUM AND OPTICAL INFORMATION RECORDING/REPRODUCTION APPARATUS

(75) Inventors: Takuya Wada, Yawata (JP); Hideki Aikoh, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 10/475,794

(22) PCT Filed: Apr. 22, 2002

(86) PCT No.: PCT/JP02/03974

§ 371 (c)(1),
(2), (4) Date: Oct. 23, 2003

(87) PCT Pub. No.: WO02/089137

PCT Pub. Date: Nov. 7, 2002

(65) Prior Publication Data

US 2004/0139460 A1 Jul. 15, 2004

(30) Foreign Application Priority Data

Apr. 23, 2001 (JP) ........................................ 2001-123827

(51) Int. Cl.[7] ................................................. G11B 7/24
(52) U.S. Cl. ...................................................... 720/723
(58) Field of Search ................................ 720/723, 710; 369/283; 156/73.1; 428/64.4

(56) References Cited

U.S. PATENT DOCUMENTS

| | | | | |
|---|---|---|---|---|
| 4,841,517 A | * | 6/1989 | Kurihara et al. ............ | 720/723 |
| 4,871,404 A | * | 10/1989 | Murata et al. ............. | 156/73.1 |
| 5,409,756 A | * | 4/1995 | Ikeda et al. ................ | 428/64.4 |
| 6,877,165 B1 | * | 4/2005 | Aoki ......................... | 720/710 |

FOREIGN PATENT DOCUMENTS

| | | |
|---|---|---|
| JP | 2-310871 | 12/1990 |
| JP | 3-5111 | 1/1991 |
| JP | 4-325978 | 11/1992 |
| JP | 6-215517 | 9/1994 |
| JP | 7-50034 | 2/1995 |
| JP | 10-302424 | 11/1998 |
| JP | 2000-268428 | 9/2000 |

* cited by examiner

Primary Examiner—Tianjie Chen
(74) Attorney, Agent, or Firm—Hamre, Schumann, Mueller & Larson, P.C.

(57) ABSTRACT

It is an object to provide an optical information recording medium including a substrate (1) and an optical information layer in one of the layers the substrate (1) and having a light incident surface on at least one of the surfaces of the substrate side and the opposite side. The optical information recording medium also includes a magnetic clamp layer (2) at a position not disturbing the incident light into the optical information layer from the light incident surface and covering optical information layer partially or entirely. The magnetic clamp layer (2) is pulled by and fixed to the magnet of an optical information recording/reproduction apparatus. The pulling force between the clamp layer and the magnet is preferably in a range from 0.1 N to 5 N. Thus, it is possible to provide an optical information recording medium and an optical information recording/reproduction apparatus in which recording/reproduction can be performed up to the vicinity of the center of the substrate (1).

19 Claims, 7 Drawing Sheets

OPTICAL INFORMATION RECORDING MEDIUM AND OPTICAL INFORMATION RECORDING/REPRODUCTION APPARATUS

TECHNICAL FIELD

The present invention relates to optical information recording media and optical information recording and reproduction apparatuses for recording and reproducing information.

BACKGROUND ART

Optical information recording/reproduction apparatuses using disk-shaped optical information recording media are available in a variety of different forms, including compact disk (CD) players and mini-disk (MD) recorders. Advances in recent years have led to increasingly small information recording media and recording/reproduction apparatuses.

Hereinafter, an example of an above-mentioned conventional optical information recording medium and optical information recording/reproduction apparatus will be described with reference to the drawings.

FIG. 11 is a cross-sectional diagram showing the configuration of a conventional optical information recording medium and an optical information recording/reproduction apparatus. In FIG. 11, a substrate 51 has a light incidence surface 51c and an information layer 51e parallel to the light incidence surface 51c. The substrate 51 is provided with a turntable set surface 51b, which is parallel to the light incidence surface 51c, formed near its center and a centering portion 51a, which is a center aperture. A magnetic clamping plate 52 made of a magnetic material is fastened onto the surface of the substrate 51 opposite the turntable set surface 51b, forming an optical information recording medium. The reference numeral 53 denotes a turntable on which the substrate 51 is placed, and the turntable 53 is provided in a single unit with a turntable centering member 53a. A magnet 54 is fastened to the middle of the turntable 53, forming a support member. The turntable 53 is fastened to a spindle motor 55, which is a rotating member. The turntable centering member 53a and the central rotation axis of the spindle motor 54 coincide with one another. A pickup 56 for irradiating light onto the light incidence surface 51c of the substrate 51 so as to store and reproduce information is disposed on the same side as the turntable 53 with respect to the substrate 51.

Hereinafter, the operations of the optical information recording medium and the optical information recording/reproduction apparatus configured as above are described below.

The substrate 51 is placed on the turntable 53 so that the centering portion 51a provided in the substrate 51 engages with the turntable centering member 53a in the turntable 53. At this time, the light incidence surface 51c of the substrate 51 is on the side of the turntable. The substrate 51 is pushed against the turntable 53 due to the attractive force that is generated between the magnet 54 and the magnetic clamping plate 52. The turntable 53 and the substrate 51 rotate as a single unit due to the rotation of the spindle motor 55. The light emitted from the pickup 56, which is on the same side as the turntable 53 with respect to the substrate 51, is irradiated onto the information layer 51e from the light incidence surface 51c of the substrate 51, storing or reproducing information. As the pickup 56 moves in the radial direction of the substrate 51, the light emitted from the pickup 56 can be irradiated over the entire surface of an information region 51d, storing or reproducing information.

In recent years, disk-shaped information recording media such as optical disks have become progressively more compact, leading to smaller outer shapes and smaller areas onto which information can be stored. With the conventional optical information recording/reproduction apparatus in FIG. 11, the pickup 56 cannot be moved more inward than the position of the radius R2 due to interference by the spindle motor, and information cannot be stored or reproduced in the region near the center of the substrate 51 because the light emitted from the pickup cannot be irradiated there. Also, the turntable set surface 51b, which comes into contact with the turntable 53, of the substrate 51 is a region in which information cannot be stored or reproduced because the light emitted from the pickup 56 cannot be irradiated there. For example, with a mini-disk, the outer diameter D51 of the substrate 51 in FIG. 11 is 64 mm and the diameter of the information region is from 32 mm to 61 mm. The percentage of the area of the information region with respect to the total area of the 64 mm diameter is 66%. When the diameter of the substrate is set to a small diameter of 50 mm, then the percent thereof that is the information region becomes 47%. In order to increase the percentage of the information region, it is necessary to reduce the outer diameters of the turntable 53 and the turntable set surface 51b so as to reduce the region in which recording and reproduction is not possible. However, when the outer diameters of the turntable 53 and the turntable set surface 51b are reduced, the support for the substrate 51 becomes unstable, leading to the risk that the rotation of the spindle motor 55 may not be transmitted accurately or that the increase in surface vibration of the substrate 51 may make the recording or reproduction of information with respect to the substrate 51 unstable. Thus, it was not possible to significantly reduce the outer diameter of the turntable 53, and this led to the problem that the percentage of the information region with respect to the total area of the substrate 51 becomes smaller when the outer diameter of the substrate 51 is reduced.

DISCLOSURE OF INVENTION

The present invention solves the foregoing conventional problem, and it is an object thereof to provide an optical information recording medium and an optical information recording/reproduction apparatus with which recording and reproduction is possible in locations up to near the center of the substrate.

To achieve the above object, an optical information recording medium of the invention has a substrate and an optical information layer in any layer on the substrate, and is provided with a light incidence surface on at least one surface selected from a substrate side surface and a surface opposite the substrate and a magnetic clamp layer in a location in which it does not interfere with light incident on the optical information layer from the light incidence surface and in which it covers part or all of the optical information layer.

Also, an optical information recording/reproduction apparatus of the invention is provided with an optical pickup apparatus for irradiating light from a light incidence surface side onto an information layer of an optical information recording medium that has a substrate and the optical information layer in any layer on the substrate, and that includes the light incidence surface on at least one surface selected from a substrate side surface and a surface opposite the substrate and a magnetic clamp layer in a location in which it does not interfere with light incident on the information layer from the light incidence surface and in which it covers part or all of the optical information layer;

a support member located on the side opposite the optical pickup apparatus with respect to the optical information recording medium, and which supports the optical information recording medium;

an attraction member fastened to the support member, and which is for magnetically attracting the clamp layer; and a rotating member for rotating the support member.

Figure 1:
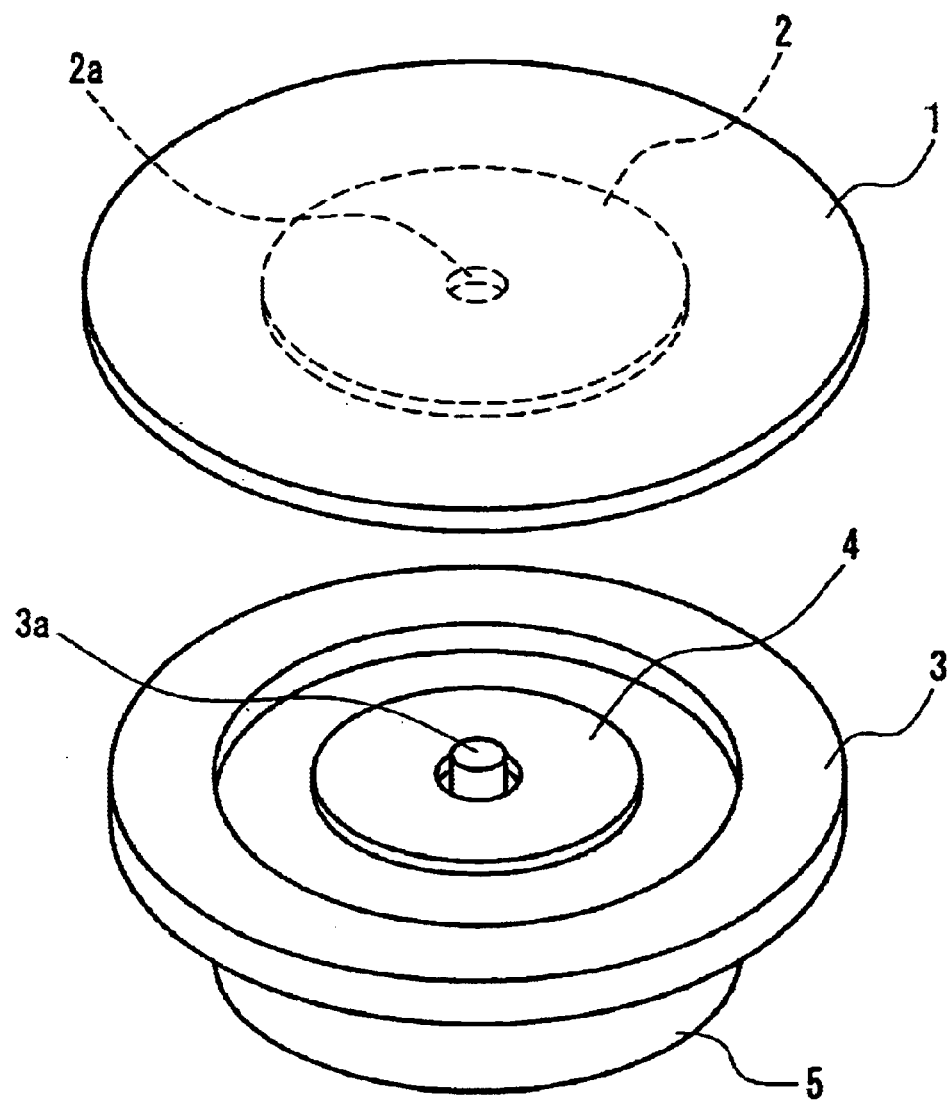
FIG. 1 is a perspective view showing an optical information recording medium and an optical information recording/reproduction apparatus according to a first embodiment of the invention.

1 substrate
2 magnetic clamping plate
3 turntable
4 magnet
5 spindle motor
6 pickup

BEST MODE FOR CARRYING OUT THE INVENTION

The optical information recording medium of the invention is provided with a magnetic clamp layer in a location in which it does not interfere with the light incident on the optical information layer from the light incidence surface and in which it covers part or all of the optical information layer. Thus, information can be stored and reproduced in locations up to near the center of the optical information recording medium, even if it has a small outer diameter, so that the recording capacity can be made larger than that of conventional configurations. Also, the magnetic clamp layer and the attraction member, which has magnetic attraction, attached to the optical information recording/reproduction apparatus attract one another, and therefore the optical information recording medium can be stably fixed.

In this invention, it is also possible for the substrate and the optical information layer both to be single layers, and for the magnetic clamp layer to be provided opposite the light incidence surface. Alternatively, the substrate can be made of a first substrate and a first optical information layer, and a second substrate and a second optical information layer, and the surfaces of the first substrate and the second substrate that are opposite their light incidence surfaces can be adhered facing one another with the magnetic clamp layer formed in between them.

The clamp layer can be a thin film formed directly on the substrate by vapor deposition or sputtering. Alternatively, the clamp layer can be a thin film that also serves as a reflecting film adhered to the optical information layer.

The clamp layer also can serve as a protection layer closely adhered to the reflecting film.

Further, the clamp layer can be a thin sheet fixedly adhered to the substrate.

The substrate and the clamp layer can be fixed in a composite molding of resin material. Also, the clamp layer and the first substrate and the second substrate can be fixed in a composite molding of resin material.

For the centering portion for determining the center position of the substrate, at least one centering portion selected from one or more of apertures and protrusions is preferably provided in the clamp layer.

The rigidity of the clamp layer can be higher than the rigidity of the substrate, the flatness of the clamp layer can be higher than the flatness of the substrate, and the flatness of the substrate can be regulated by the flatness of the clamp layer by fastening the clamp layer to the substrate.

It is preferable that the maximum dimensions of the substrate are not more than 80 mm and the surface area of the information layer is at least 80% of the total outside area of the substrate.

Next, in the optical information recording/reproduction apparatus of the present invention, it is preferable that the external shape of the support member and the external shape of the optical information recording medium substantially match one another. Thus, the recording and reproduction of information is possible at locations up to near the center of the optical information recording medium, even if it has a small outer diameter, so that the recording capacity can be made larger than that of conventional configurations.

The external shape of the support member can substantially match the external shape of the optical information recording medium in which the external shape of the clamp layer and the external shape of the substrate substantially match one another.

The rigidity of the support member can be higher than the rigidity of the clamp layer and the substrate, the flatness of the support member can be higher than the flatness of the clamp layer and the substrate, and the flatness of the substrate can be regulated by the flatness of the support member due to the force of attraction between the clamp layer and the attraction member.

In this invention, the force of attraction between the clamp layer and the attraction member (magnet) is preferably in a range of not less than 0.1 N and not more than 5 N, more preferably in a range of not less than 0.2 N and not more than 3 N, and particularly preferably in a range of not less than 0.2 N and not more than 2 N. When the force of attraction is less than 0.1 N it is difficult to exhibit an attractive effect, and when it is greater than 5 N the costs become high, neither of which is preferable.

Hereinafter, embodiments of the invention are described with reference to the drawings.

First Embodiment

Figure 2:
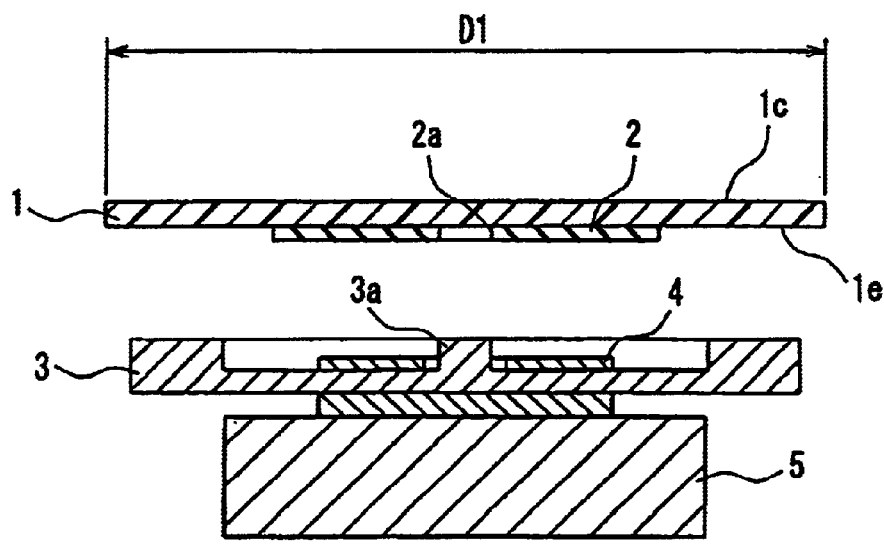
FIG. 2 is a cross-sectional view showing the optical information recording medium and the optical information recording/reproduction apparatus according to the first embodiment of the invention.
Figure 3:
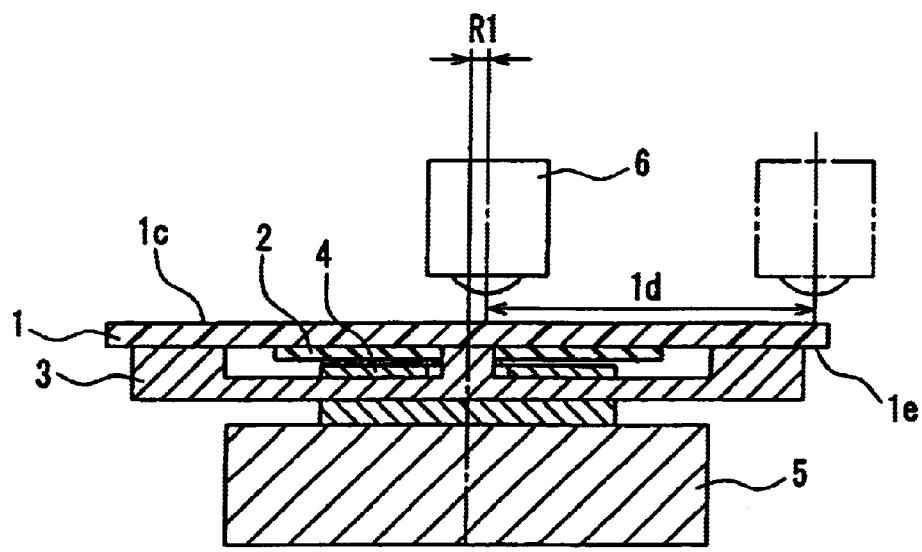
FIG. 3 is a cross-sectional view showing the optical information recording medium and the optical information recording/reproduction apparatus according to the first embodiment of the invention.

FIG. 1 is a perspective view showing the configuration of an optical information recording medium and an optical information recording/reproduction apparatus, and FIGS. 2 and 3 are cross-sectional views thereof. In FIG. 1 and FIG. 2, the reference numeral 1 denotes a substrate, and an magnetic clamping plate 2, which is a clamp layer formed by a magnetic material, is fastened to a rear side 1e of a light incidence surface 1c of the substrate 1, forming an optical information recording medium. An aperture serving as a centering portion 2a is provided near the center of the magnetic clamping plate 2. The substrate 1 has the light incidence surface 1c and an information layer parallel to the light incidence surface 1c.

Figure 4:
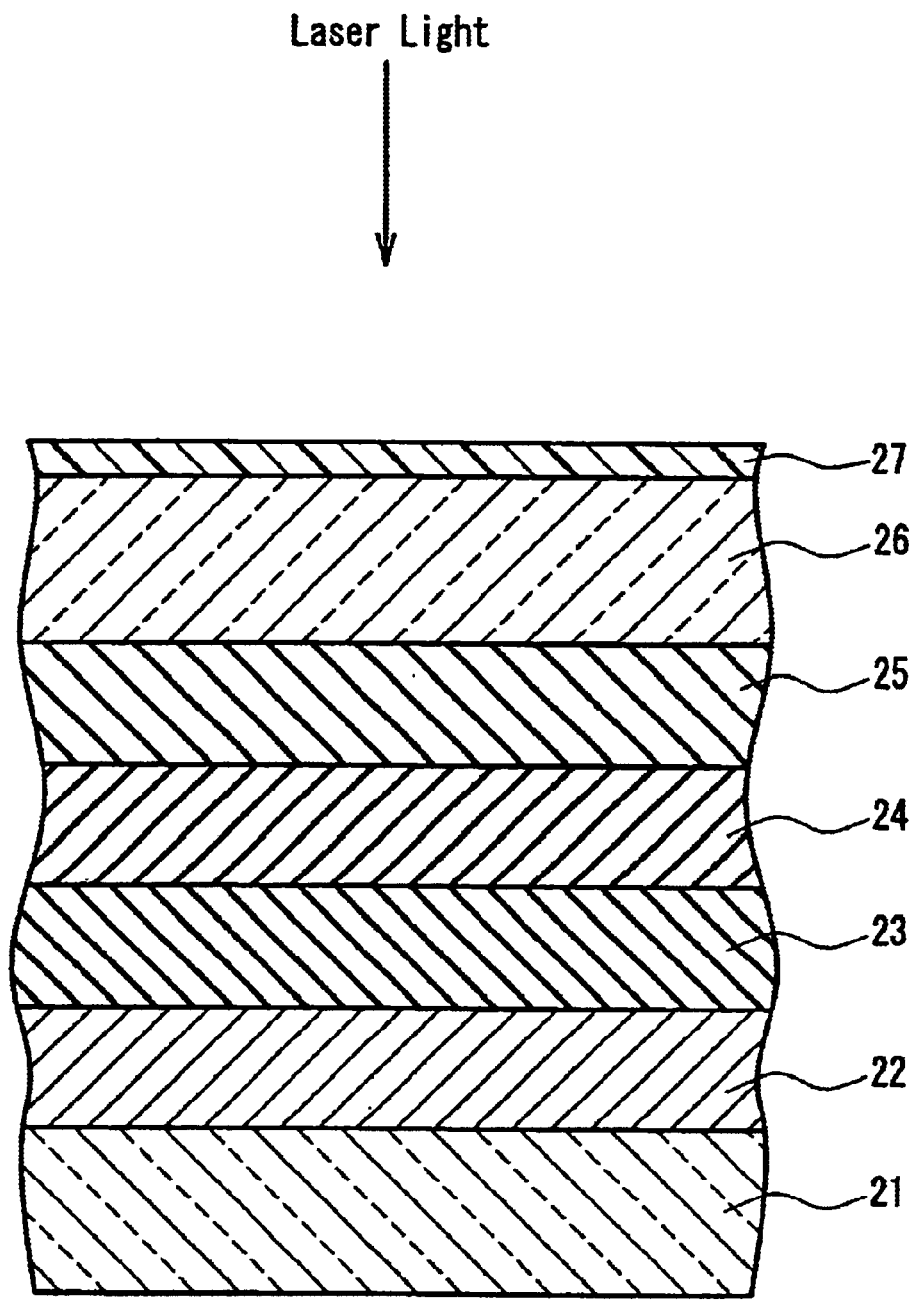
FIG. 4 is a cross-sectional view of the optical information recording medium according to the first embodiment of the invention.

A substrate having grooves and lands formed in alternation every 0.34 micron, made of polycarbonate with a diameter of 80 mm and a thickness of 0.6 mm, and having signal recording tracks, is used as the disk employed in this embodiment. As shown in FIG. 4, an Ag reflection layer 22 with a thickness of 100 nm is formed by sputtering on a disk-shaped polycarbonate substrate 21, a ZnS—SiO$_2$ composite film with a thickness of 100 nm is formed by sputtering to serve as a first dielectric layer 23, and a composition with an atom percentage ratio of Ge:Sb:Te= 20:25:55 and a thickness of 12 nm is formed by sputtering to serve as a recording layer 24. A Ta$_2$O$_5$ film with a thickness of 50 nm is formed by sputtering on the surface of the recording layer 24 to serve as a second dielectric layer 25, and on the surface of the second dielectric layer 25 a 10 μm thick transparent protection film 26 is formed by applying an optically cured acrylic resin by spin-coating and then using ultraviolet (UV) light. Next, a hard-coat film 27 is formed on the surface of the transparent protection film 26. The hard-coat film 27 is formed by applying a commercially sold ultraviolet curable silicon resin coating agent by spin-coating and then carrying out ultraviolet curing. The hard-coat film 27 has a film thickness of 2 μm. This optical information disk is a DVD disk in which blue laser light is incident from the hard-coat film 27 side.

In addition, a 40 mm diameter disk having a central aperture with a diameter of 5 mm is punched out from a 0.4 mm thick magnetic stainless steel sheet made of iron including 18 weight percent chromium through a pressing technique using a mold. As shown in FIG. 2, this is attached to the surface 1e opposite to the light incidence surface 1c of the substrate 1 using an epoxy-based adhesive agent and serves as the magnetic clamping plate 2 (clamp layer).

The substrate 1 fabricated as shown above is placed on the turntable 3. A turntable centering member 3a is formed near the center of the turntable 3 in a single unit therewith. A magnet 4, which is an attraction member made of a neodymium-iron-boron magnet, is fastened to the turntable 3, forming a support member. The turntable 3 is fastened to a spindle motor 5, which is a rotating member. In FIG. 3, the reference numeral 6 denotes a pickup for storing and reproducing information by irradiating an emission light onto the substrate 1.

The operations of the optical information recording medium and the optical information recording/reproduction apparatus configured as above are described below.

In FIG. 2, the substrate 1 is placed on the turntable 3 so that the centering portion 2a provided in the magnetic clamping plate 2 engages with the turntable centering portion 3a provided in the turntable 3. At this time, the substrate 1 is pushed against the turntable 3 by the attraction force that is generated between the magnet 4 and the magnetic clamping plate 2. This force of attraction is N. The turntable 3 is fastened to the spindle motor 5, and the optical information recording medium is rotated by the rotation of the spindle motor 5. FIG. 3 shows how the optical information recording medium is set on the optical information recording/reproduction apparatus through this operation. In FIG. 3, the light that is emitted from the pickup 6 is irradiated onto the information layer from the light incidence surface 1c of the substrate 1, storing or reproducing information. The pickup 6 is moved in the radial direction of the substrate 1 by a transport means (not shown). The turntable 3 is positioned at the surface opposite to the light incidence surface 1c of the substrate 1.

Figure 11:
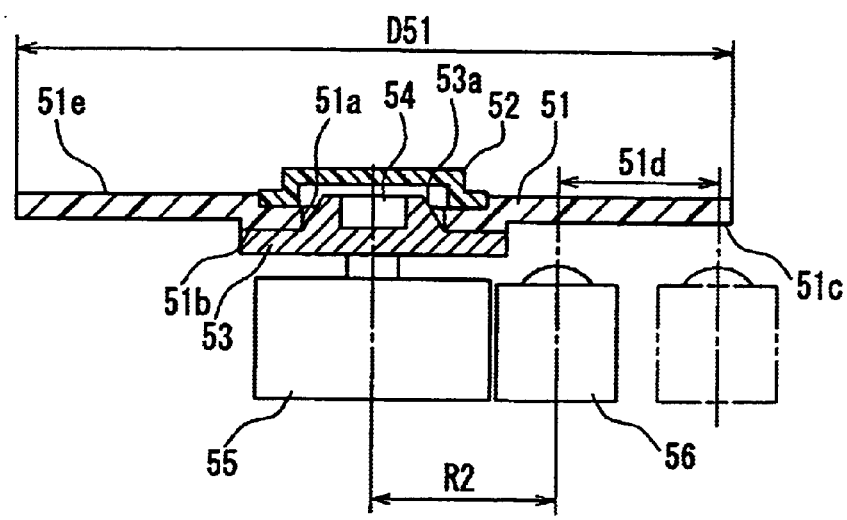
FIG. 11 is a cross-sectional view showing a conventional optical information recording medium and optical information recording/reproduction apparatus.

The pickup 6 can be moved to the position of the radius R1, which is smaller than R2 described in FIG. 11 of the conventional example, allowing the light emitted from the pickup 6 to be irradiated over substantially the entire surface of the substrate 1 from near its center to its outer circumference. In other words, substantially the entire surface of the substrate, in which there are hardly any non-recordable regions, becomes an optical information recording medium, that is, the information region 1d. For example, with the conventional configuration shown in FIG. 11, when the outer diameter D1 of the substrate 51 is set to 50 mm, the percentage of the information region with respect to the total area is 47%, however, with the present embodiment as shown in FIG. 1, when the inner diameter of the information region is set to 6 mm, then the percentage of the information region with respect to the total area is 87%. Also, to achieve an information region with the same area as when the outer diameter of the substrate is 50 mm in the conventional configuration, the outer diameter of the information region is 36.3 mm when the inner diameter of the information region is set to 6 mm, and the outer diameter D1 of the substrate 1 can be reduced to about 38 mm.

The outer diameter of the spindle motor 5 can be made larger than in the conventional example because the pickup 6 and the spindle motor 5 of the optical information recording/reproduction apparatus are at the front and rear, respectively, of the substrate 1, and thus as long as the same torque is obtained, the apparatus can be made thinner. In the future, if the dimensions in the direction of the optical axis of the pickup 6 are reduced using thin-film technologies, for example, then it will be possible to make the dimensions in the direction of the optical axis (height dimensions) of information recording/reproduction apparatuses smaller than in the conventional example.

Second Embodiment

In this embodiment, an example is described in which the magnetic clamping plate 2 is in contact with the turntable 3.

Figure 5:
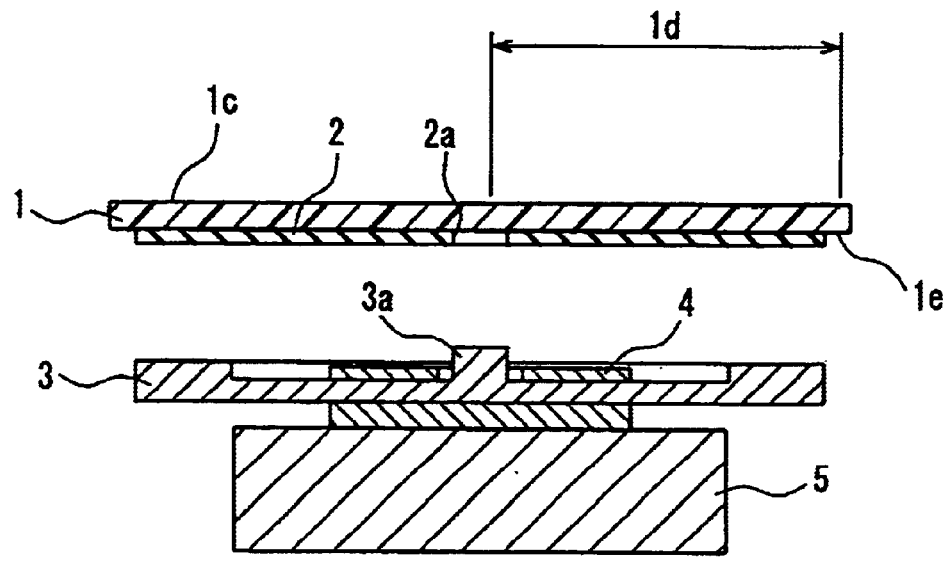
FIG. 5 is a cross-sectional view showing another example of an optical information recording medium and an optical information recording/reproduction apparatus according to a second embodiment of the invention.

In FIG. 5, the method for forming an optical information recording medium is the same as that of the first embodiment, and is illustrated in FIGS. 3 and 4. The diameter of the substrate 1 is 80 mm, the diameter of the magnetic clamping plate 2 is 78 mm, and the force of attraction is 2N. In the second embodiment, the light emitted from the pickup can be irradiated over substantially the entire surface of the substrate 1, from near its center to its outer circumference, obtaining the same effects as in the first embodiment. Also, by making the rigidity and the flatness of the magnetic clamping plate 2 higher than those of the substrate 1, the flatness of the substrate 1 can be increased by fixedly adhering it to the magnetic clamping plate 2, which has high rigidity and flatness, even if the substrate 1 is thin and has low rigidity.

Figure 6:
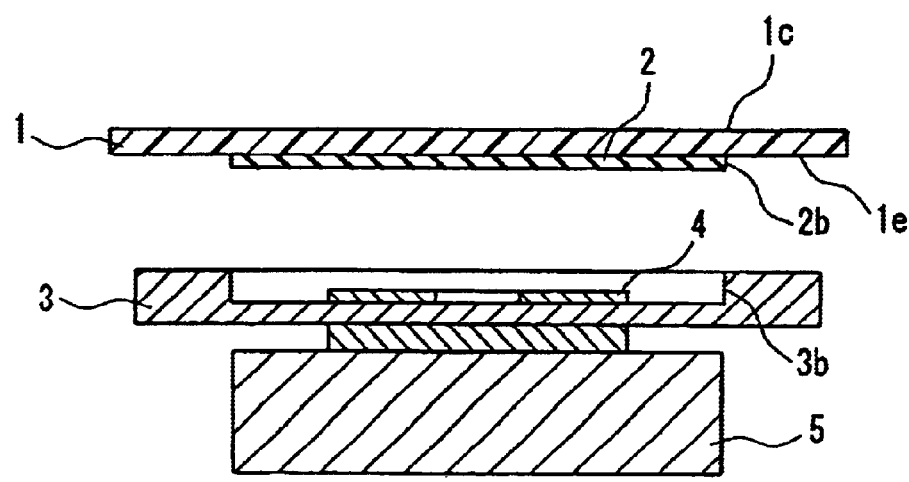
FIG. 6 is a cross-sectional view showing another example of an optical information recording medium and an optical information recording/reproduction apparatus according to the second embodiment of the invention.

In the first embodiment, the centering portion 2a that engages with the turntable centering member 3a provided near the center portion of the turntable 3 is formed near the center portion of the magnetic clamping plate 2 as shown in FIG. 3. However, as shown in FIG. 6, the same effects can be achieved even if the outer circumference of the magnetic clamping plate 2 engages the turn table 2.

Figure 8:
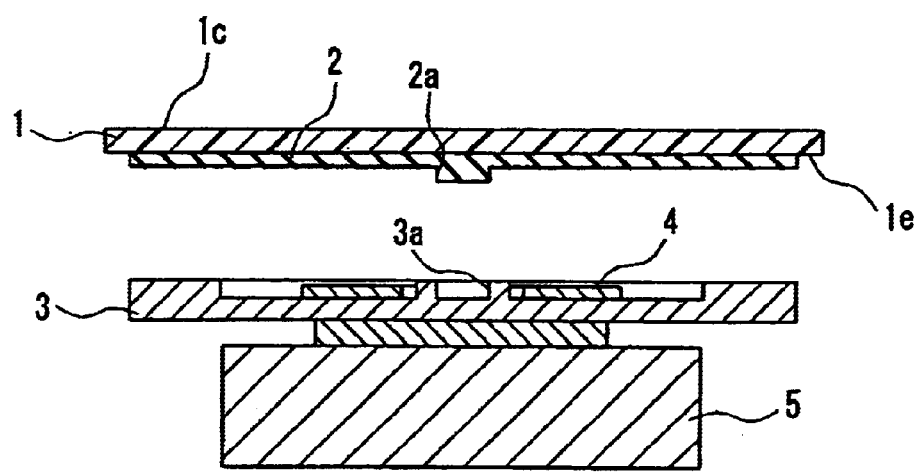
FIG. 8 is a cross-sectional view showing another example of an optical information recording medium and an optical information recording/reproduction apparatus according to the second embodiment of the invention.

In this embodiment, an aperture was provided in the magnetic clamping plate as the centering portion and a protruding turntable centering member was provided in the turntable. However, as shown in FIG. 8, the same effects can be achieved by providing a protruding centering portion 2a and a recessed turntable centering member 3a.

Third Embodiment

In this embodiment, an example is described in which two substrates are adhered to one another in such a manner that they sandwich the magnetic clamping plate 2 and that their light incidence surfaces are facing outward.

Figure 7:
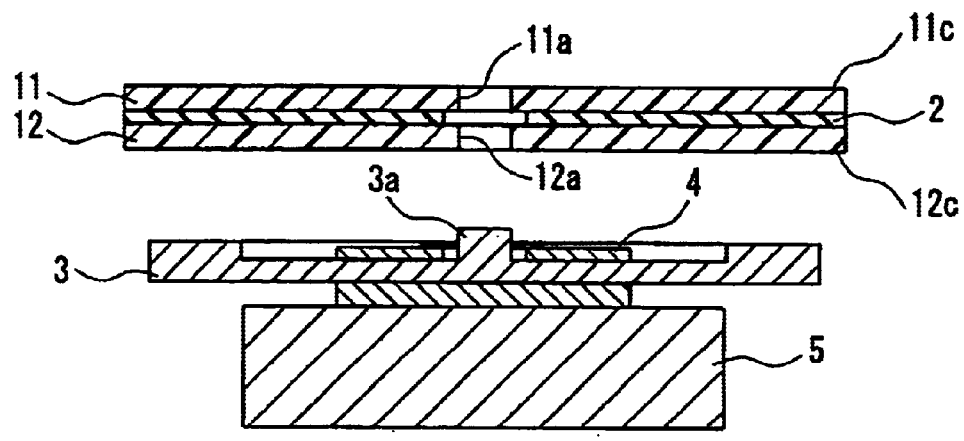
FIG. 7 is a cross-sectional view showing another example of an optical information recording medium and an optical information recording/reproduction apparatus according to a third embodiment of the invention.

In FIG. 7, the magnetic clamping plate 2 is made of an 80 mm diameter disk that is punched out from a 0.4 mm thick magnetic stainless steel sheet including 18 weight percent chromium in iron by a pressing technique using a mold. The force of attraction was 2N. Also, in the same manner as in the first embodiment and explained in FIG. 4, a reflection layer, a dielectric layer, a recording layer, a protection film, and a hard-coat film were formed on substrates 11 and 12, which each have an 80 mm diameter and an aperture with a 5 mm diameter in its center. The substrates 11 and 12 were adhered to one another using an epoxy-based adhesive agent such that they sandwich the magnetic clamping plate 2 and that their light incidence surfaces are facing outward, forming an optical information recording medium. In the third embodiment, the light emitted from the pickup can be irradiated over substantially the entire surfaces of the substrates 11 and 12 from near their center to their outer circumference, obtaining effects that are equivalent to those of the first embodiment. Also, by making the rigidity and the flatness of the magnetic clamping plate 2 higher than those of the substrates 11 and 12, the flatness of the substrates 11 and 12 can be increased, even if the substrates 11 and 12 are thin and have low rigidity, by fixedly adhering them to the magnetic clamping plate 2, which has high rigidity and flatness.

Fourth Embodiment

In this embodiment, an example is described in which the reflecting film and the clamp layer are constituted by a single material.

Figure 9:
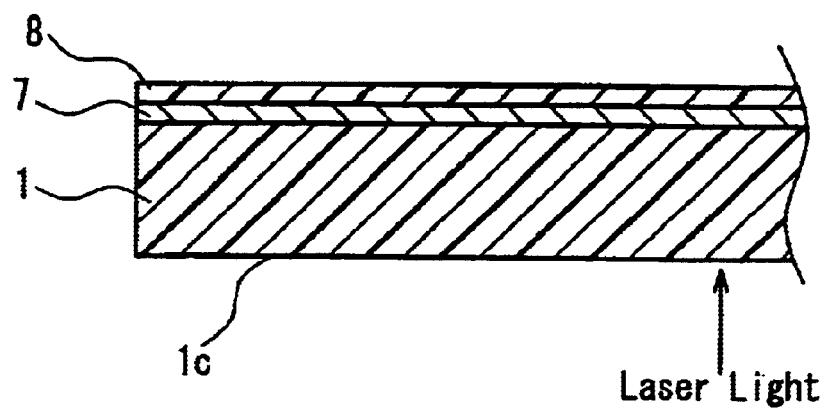
FIG. 9 is a cross-sectional view showing another example of an optical information recording medium and an optical information recording/reproduction apparatus according to a fourth embodiment of the invention.

As shown in FIG. 9, a reflecting film 7 is formed on the substrate 1 on the surface opposite the light incidence surface 1c by layering nickel to a thickness of 5 μm through vapor deposition, and then a photo-cured acrylic resin is applied to the surface of the reflecting film 7 by spin-coating and ultraviolet light is used to form a 10 μm thick protective film 8. The nickel reflecting film 7 is magnetic and is attracted to the magnet 4, so that the same effects as in the first embodiment are achieved. The force of attraction was 0.5 N. This example allows a low-cost optical information recording medium to be achieved because it is not necessary to adhere an attraction plate to serve as the clamp layer.

Fifth Embodiment

In this embodiment, an example is described in which the magnetic clamping plate and the substrate are provided as a single unit.

First, the magnetic clamping plate is inserted into the mold in which the substrate is formed. The magnetic clamping plate is formed as a disk having a diameter of 40 mm by subjecting a 0.4 mm thick stainless steel plate including 18 weight percent chromium to a press. Polycarbonate, the material of the substrate, is melted and poured into the mold. The polycarbonate is cooled and hardened, forming a substrate having a diameter of 80 mm that is fixedly adhered to the surface of the magnetic clamping plate. In the same manner as shown in FIG. 4, a reflection layer, a dielectric layer, a recording layer, a protection film, and a hard-coat film are formed on substrate on the surface of the side opposite the surface to which the magnetic clamping plate is fixed, forming an optical information recording medium. The attraction force of the magnetic clamping plate was 2N.

In this example, the same effects as of the first embodiment can be achieved, even through the substrate is provided in a single unit with the magnetic clamping plate. Moreover, it is possible to achieve a low-cost optical information recording medium because it is not necessary to adhere the magnetic clamping plate.

In this embodiment, the magnetic clamping plate 2 is sheet-shaped with a thickness of about 0.1 mm and can achieve the same effects, even though it is provided fixedly adhered to the substrate 1.

In this embodiment, the information that is stored and reproduced by the optical pickup, is stored on the substrate, and the magnetic clamping plate is fixedly adhered to the substrate. However, the same effects can be achieved with an optical information recording medium in which the information is stored on the magnetic clamping plate and the substrate is formed by providing the resin material and the magnetic clamping plate in a single unit.

Sixth Embodiment

Figure 10:
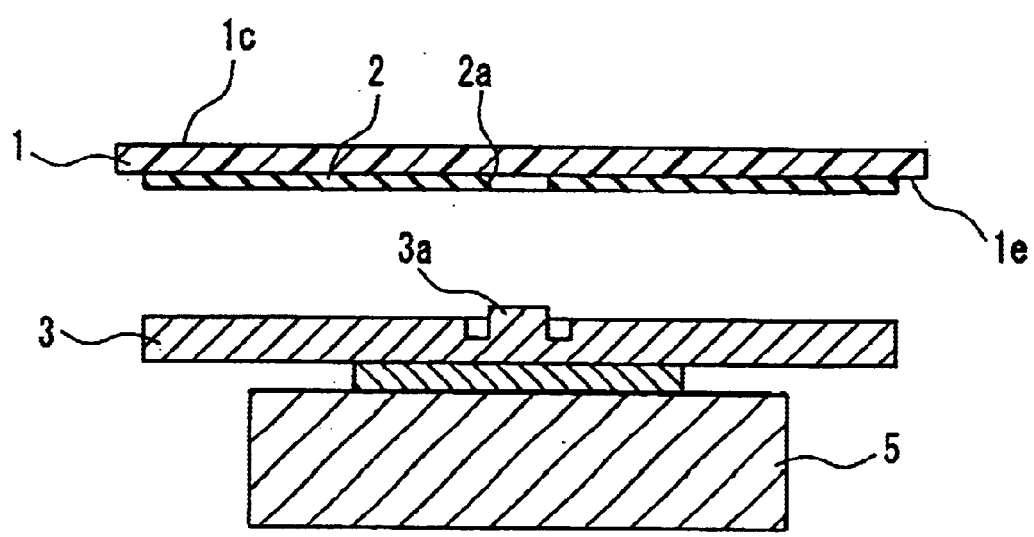
FIG. 10 is a cross-sectional view showing another example of an optical information recording medium and an optical information recording/reproduction apparatus according to a sixth embodiment of the invention.

In FIG. 10, the substrate 1 is made of a reflection layer, a dielectric layer, a recording layer, a protection film, and a hard-coat film in the same manner as in the first embodiment and illustrated in FIG. 4. The substrate 1 has a diameter of 80 mm. The magnetic clamping plate 2 is formed as a disk with a thickness of 1 mm and a diameter of 70 mm by ejection molding using a bond magnet, in which the powder of a neodymium-iron-boron magnet was mixed into an epoxy resin. The substrate 1 and the magnetic clamping plate 2 were adhered to one another using an epoxy-based adhesive, forming an optical information recording medium. The turntable 3 was formed by cutting and processing magnetic stainless steel with iron containing 18 weight percent chromium. The substrate can be fixed onto the turntable due to the magnetic attraction force (2N) acting between the magnetic clamping plate and the turntable. In the sixth embodiment, the light that is emitted from the pickup can be irradiated over substantially the entire surface of the substrate 1 from near its center to its outer circumference, obtaining the same effects as in the first embodiment.

In this embodiment, the optical information recording medium is in the shape of a disk. However, it can also have a shape other than that of a disk, such as a rectangular shape.

In this embodiment, the optical information recording medium is rotated by the spindle motor during operation of the optical information recording/reproduction apparatus. However, the same effects can be achieved with a configuration in which it is moved parallel to the substrate.

In this embodiment, the optical information recording medium is rotated by the spindle motor and the pickup is moved by a transport means during the operation of the optical information recording/reproduction apparatus. However, the same effects can be achieved even if the optical information recording medium is configured so that only the pickup moves parallel to the substrate without the rotating operation.

INDUSTRIAL APPLICABILITY

With the present invention, information can be stored and reproduced in locations up to near the center of the optical information recording medium, even if it has a small outer diameter, so that the recording capacity can be made larger than that of conventional configurations. Also, because the spindle motor can be made thin, a reduction in the size of the optical information recording/reproduction apparatus can be achieved to match the reduction in size of the optical information recording medium. Furthermore, when the outer diameters of the substrate and the magnetic clamping plate are substantially identical, the precision can be increased by fixing the substrate to the magnetic clamping plate, even if the substrate is thin or bending occurs. When the outer diameter of the support member is substantially identical to the outer diameter of the optical information recording medium, then it becomes easier to align the center of the support member and the center of the optical information recording medium when the optical information recording medium is placed on the support member, and by stabilizing the support for the optical information recording medium, it is possible to achieve an optical information recording medium and an optical information recording/reproduction apparatus with stable recording and the reproduction operations.

What is claimed is:

1. An optical information recording medium having a substrate and an optical information layer in any layer on the substrate, and comprising a light incidence surface on at least one surface selected from a substrate side surface and a surface opposite the substrate, the optical information recording medium comprising: a magnetic clamp layer in a location in which it does not interfere with light incident on the optical information layer from the light incidence surface and in which it covers part or all of the optical information layer.

2. The optical information recording medium according to claim 1, wherein the substrate and the optical information layer are both single layers, and a magnetic clamp layer is provided opposite the light incidence surface.

3. The optical information recording medium according to claim 1, wherein the substrate is made of a first substrate and a first optical information layer as well as a second substrate and a second optical information layer, and surfaces of the first substrate and the second substrate that are opposite their light incidence surfaces are adhered facing one another with the magnetic clamp layer provided in between.

4. The optical information recording medium according to claim 3, wherein the clamp layer and the first substrate and the second substrate are fixed in a composite molding of resin material.

5. The optical information recording medium according to claim 1, wherein the clamp layer is a thin film formed directly on the substrate by vapor deposition or sputtering.

6. The optical information recording medium according to claim 1, wherein the clamp layer is a thin film that also serves as a reflecting film adhered to the optical information layer.

7. The optical information recording medium according to claim 6, wherein the clamp layer also serves as a protection layer adhered to the reflecting film.

8. The optical information recording medium according to claim 1, wherein the clamp layer is a thin sheet fixedly adhered to the substrate.

9. The optical information recording medium according to claim 1, wherein the substrate and the clamp layer are fixed in a composite molding of resin material.

10. The optical information recording medium according to claim 1, wherein at least one centering portion selected from one or more of apertures and protrusions is provided in the clamp layer as a centering portion for determining a center position of the substrate.

11. The optical information recording medium according to claim 1, wherein a rigidity of the clamp layer is higher than a rigidity of the substrate, a flatness of the clamp layer is higher than a flatness of the substrate, and the flatness of the substrate is regulated by the flatness of the clamp layer by fastening the clamp layer to the substrate.

12. The optical information recording medium according to claim 1, wherein maximum dimensions of the substrate are not more than 80 mm and a surface area of the information layer is at least 80% of a total outside area of the substrate.

13. An optical information recording/reproduction apparatus comprising:
    an optical pickup apparatus for irradiating light from a light incidence surface side onto an information layer of an optical information recording medium having a substrate and the information layer in any layer on the substrate, and comprising the light incidence surface on at least one surface selected from a substrate side surface and a surface opposite the substrate, and a magnetic clamp layer in a location in which does not interfere with light incident on the information layer from the light incidence surface and in which it covers part or all of the optical information layer;
    a support member which is located on a side opposite the optical pickup apparatus with respect to the optical information recording medium, and which has an attraction member for attracting the magnetic clamp layer that is provided a location in which it covers part or all of the magnetic information layer; and
    a rotating member for rotating the support member.

14. The optical information recording/reproduction apparatus according to claim 13, wherein an external shape of the support member and an external shape of the optical information recording medium substantially match one another.

15. The optical information recording/reproduction apparatus according to claim 13, wherein an external shape of the support member substantially matches an external shape of the optical information recording medium, in which an external shape of the clamp layer and an external shape of the substrate substantially match one another.

16. The optical information recording/reproduction apparatus according to claim 13, wherein a rigidity of the support member is higher than a rigidity of the clamp layer and the substrate, a flatness of the support member is higher than a flatness of the clamp layer and the substrate, and the flatness of the substrate is regulated by the flatness of the support member due to attraction between the clamp layer and the attraction member.

17. The optical information recording/reproduction apparatus according to claim 13, wherein maximum dimensions of the substrate are not more than 80 mm and a surface area of the information layer is at least 80% of a total outside area of the substrate.

18. The optical information recording/reproduction apparatus according to claim 13, wherein an attraction force between the clamp layer and the attraction member is in a range of 0.1 N to 5 N.

19. An optical information recording medium for use of an optical pickup apparatus for irradiating light from a light incidence surface side onto an information layer of an optical information recording medium having a substrate and the information layer in any layer on the substrate, and comprising the light incidence surface on at least one surface selected from a substrate side surface and a surface opposite the substrate, and a magnetic clamp layer in a location in which does not interfere with light incident on the information layer from the light incidence surface and in which it covers part or all of the optical information layer;

a support member which is located on a side opposite the optical pickup apparatus with respect to the optical information recording medium, and which has an attraction member for attracting the magnetic clamp layer that is provided a location in which it covers part or all of the magnetic information layer; and a rotating member for rotating the support member, wherein the substrate and the optical information layer in any layer on the substrate, and comprising a light incidence surface on at least one surface selected from a substrate side surface and a surface opposite the substrate, the optical information recording medium comprising: a magnetic clamp layer in a location in which it does not interfere with light incident on the optical information layer from the light incidence surface and in which it covers part or all of the optical information layer.

* * * * *